(12) United States Patent
Kyle et al.

(10) Patent No.: US 6,319,166 B1
(45) Date of Patent: Nov. 20, 2001

(54) COMPACT LOCKING DIFFERENTIAL

(75) Inventors: Robert J. Kyle; Ralph E. Holmquist, both of Battle Creek; Keith E. Morgensai; Carl R. Binkley, both of Marshall; Phillip E. Konkle, Albion; Leo M. Weeks, Olivet, all of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/571,953

(22) Filed: May 15, 2000

(51) Int. Cl.[7] .................................................. F16H 48/06
(52) U.S. Cl. .................................................... 475/232
(58) Field of Search .................................. 475/231, 232, 475/233

(56) References Cited

U.S. PATENT DOCUMENTS

| | | | |
|---|---|---|---|
| Re. 28,004 | * | 5/1974 | Otteman ................................. 475/232 |
| 3,517,573 | * | 6/1970 | Roper ..................................... 475/232 |
| 3,606,803 | * | 9/1971 | Otteman ................................. 475/232 |
| 3,811,341 | * | 5/1974 | Goscenski, Jr. ....................... 475/231 |
| 3,818,781 | * | 6/1974 | Goscenski, Jr. ....................... 475/231 |
| 3,831,462 | * | 8/1974 | Baremor ........................... 475/233 X |
| 3,845,672 | * | 11/1974 | Goscenski, Jr. ....................... 475/232 |
| 3,938,408 | * | 2/1976 | Baremor ................................. 475/232 |
| 3,985,045 | * | 10/1976 | Shilling et al. ....................... 475/232 |
| 4,265,143 | | 5/1981 | Goscenski et al. .................. 74/710.5 |
| 4,266,445 | * | 5/1981 | Goscenski, Jr. ....................... 475/232 |
| 4,389,909 | | 6/1983 | Goscenski .............................. 74/711 |
| 5,484,347 | * | 1/1996 | Holmquist ............................. 475/231 |

FOREIGN PATENT DOCUMENTS

404088240 * 3/1992 (JP) ..................................... 475/232

* cited by examiner

*Primary Examiner*—Charles A Marmor
*Assistant Examiner*—Roger Pang
(74) *Attorney, Agent, or Firm*—L. J. Kasper

(57) ABSTRACT

A locking differential of the type including a clutch pack (31,33) actuated by a cam arrangement (43,45) to lock the side gears (19,21) relative to the gear case (11). Lock-up is initiated by retarding rotation of one of the cam members (45), by means of a flyweight mechanism (51). Disposed adjacent the flyweight mechanism is a latch mechanism (63) which comprises an integral, generally U-shaped member including a bottom portion (65) and a pair of upright leg portions (71,73). The bottom portion defines a pair of integral latch member (67,69), each of which is disposed to engage one of the flyweights (53,55) when the latch mechanism is in its operative position. Each of the upright leg portions includes a pair of individual leg portions (75) disposed on opposite sides of the pinion shaft (15), extending past the axis of rotation (A), and engaging a weight (83) disposed in a window (89) on the opposite side of the gear case (11) from the flyweight mechanism.

6 Claims, 4 Drawing Sheets

COMPACT LOCKING DIFFERENTIAL

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates generally to differential mechanisms, and more particularly, to such mechanisms of the type commonly referred to as "locking differentials".

Differential gear mechanisms of the type to which the present invention relates are broadly referred to as "limited slip" differentials, and typically include a clutch pack which is operable to limit or retard differentiating action between the output gears (side gears). More specifically, however, the present invention is intended for use on limited slip differentials of the specific type referred to as locking differentials, and will be described in connection therewith. In a locking differential, some means is provided for engaging or locking the clutch set, rather than permitting it to slip, to reduce substantially (and perhaps even eliminate) the amount of differentiating action permitted between the side gears.

Locking differentials of various types are now generally well known in the art, including both inter-axle lockers, and inter-wheel lockers. Inter-wheel locking differentials may be applied to either conventional rear wheel drive vehicles, or to front wheel drive vehicles. Although the present invention may be utilized advantageously in any of the above-described types of locking differentials, it is especially advantageous when applied to an inter-wheel, rear axle locking differential, and will be described in connection therewith.

As is now quite well know to those skilled in the vehicle drive line art, one of the major problems involves the limited amount of space available for the various drive train components and accessories. In many vehicles, the engine and drive train have become increasingly efficient, resulting in higher output torques, but with no increase in the size of the differential or of its components. The lack of space becomes especially difficult in the case of a component such as a locking differential which replaces an earlier, standard component such as an open differential. In certain vehicle applications, a proposed locking differential can be no larger, radially, than the open differential previously used in that application, because any increase in the diameter of the differential case would necessitate a larger ring gear, which, in turn, would require substantial redesign of the entire rear axle assembly.

In a conventional locking differential of the type commercialized by the assignee of the invention, there is included a lockup means for locking up the differential gear set, and an actuating means for actuating the lockup means. Typically, the lockup means comprises a clutch pack and a cam arrangement in which, when the cam members "ramp up", one member moves axially and applies a compressive load to the clutch pack. The actuating means includes a rotatable flyweight mechanism and a latch mechanism which is moveable between an operative position and an inoperative position. In the operative position, the latch mechanism engages the flyweight mechanism to prevent rotation thereof, and actuate the cam arrangement of the lockup means. In the inoperative position, the latch mechanism is incapable of engaging the flyweights. Typically, the inoperative condition occurs when the rotational speed of the differential gear case exceeds a predetermined limit, by way of example only, corresponding to a vehicle speed of about 20 or 25 mph.

As is well know to those skilled in the art, the performance of an actuating means of the type to which the present invention applies can be improved by increasing the size of the flyweight mechanism, and by increasing the weight of the latch mechanism. However, in prior art locking differentials which have been made commercially, the flyweight mechanism and the latch mechanism have been disposed circumferentially adjacent each other (within one of the windows of the differential case). Thus, an attempt to improve the prior art, commercially available locking differential design by increasing the size of the flyweight mechanism or by increasing the weight of the latch mechanism would be inconsistent with the need to achieve the minimum overall size of the differential mechanism.

BRIEF SUMMARY OF THE INVENTION

Accordingly, it is an object of the present invention to provide a differential gear mechanism of the locking differential type which, in terms of size, can be a direct replacement for an open differential.

It is a more specific object of the present invention to provide a locking differential which achieves the above-stated object while still making it possible to improve the performance of the actuating means.

It is another object of the present invention to provide such an improved locking differential which achieves the above-stated objects, and in which the latch mechanism is relatively simple and inexpensive, and facilitates easy installation.

The above and other objects of the invention are accomplished by the provision of an improved differential gear mechanism comprising a gear case defining a gear chamber, a differential gear set disposed in the gear chamber, and including at least one input gear and a pair of output gears defining an axis of rotation. A lockup means for locking up the differential gear set to retard differentiating action is included and actuating means for actuating the lockup means. The lockup means includes a clutch pack operable between an engaged condition, effective to retard relative rotation between the gear case and the output gears, and a disengaged condition. The lockup means further includes cam means operable to effect the engaged condition of the clutch pack, the actuating means including retarding means operable to engage the cam means and retard a portion of the cam means. The retarding means comprises a flyweight mechanism rotatable about its axis at a speed generally proportional to the level of differentiating action, and defining a stop surface moveable from a retracted position to an extended position in response to a predetermined level of differentiating action. The actuating means further includes a latch mechanism including a latch member and means biasing the latch member toward an operative position in which the latch member is disposed to engage the stop surface when the stop surface is in the extended position. The latch mechanism further includes a weight disposed oppositely from the latch member, about the axis of rotation, the weight being operable to move the latch mechanism, in opposition to the biasing means, along a straight, generally diametrally-oriented path in response to a predetermined rotational speed of the differential gear mechanism, to move the latch member from the operative position to an inoperative position, above the predetermined rotational speed.

The improved differential gear mechanism is characterized by the latch mechanism comprising an integral, generally U-shaped member, including a bottom portion and a pair of upright leg portions. The bottom portion of the U-shaped member defines the latch member formed integrally therewith. The pair of upright leg portions of the U-shaped member extend past the axis of rotation, the weight being fixed to the leg portions.

In accordance with a more limited aspect of the invention, the differential gear mechanism is characterized by the differential gear set comprising a pair of input gears mounted for rotation about a pinion shaft fixed relative to the gear case, the pinion shaft defining an axis disposed perpendicular to the axis of rotation of the output gears. Each of the upright leg portions of the U-shaped member is itself generally U-shaped and comprises a pair of oppositely disposed individual leg portions, the individual leg portions being disposed on opposite sides of the pinion shaft.

DETAILED DESCRIPTION OF THE PREFERRED EMBODIMENT

Figure 1:
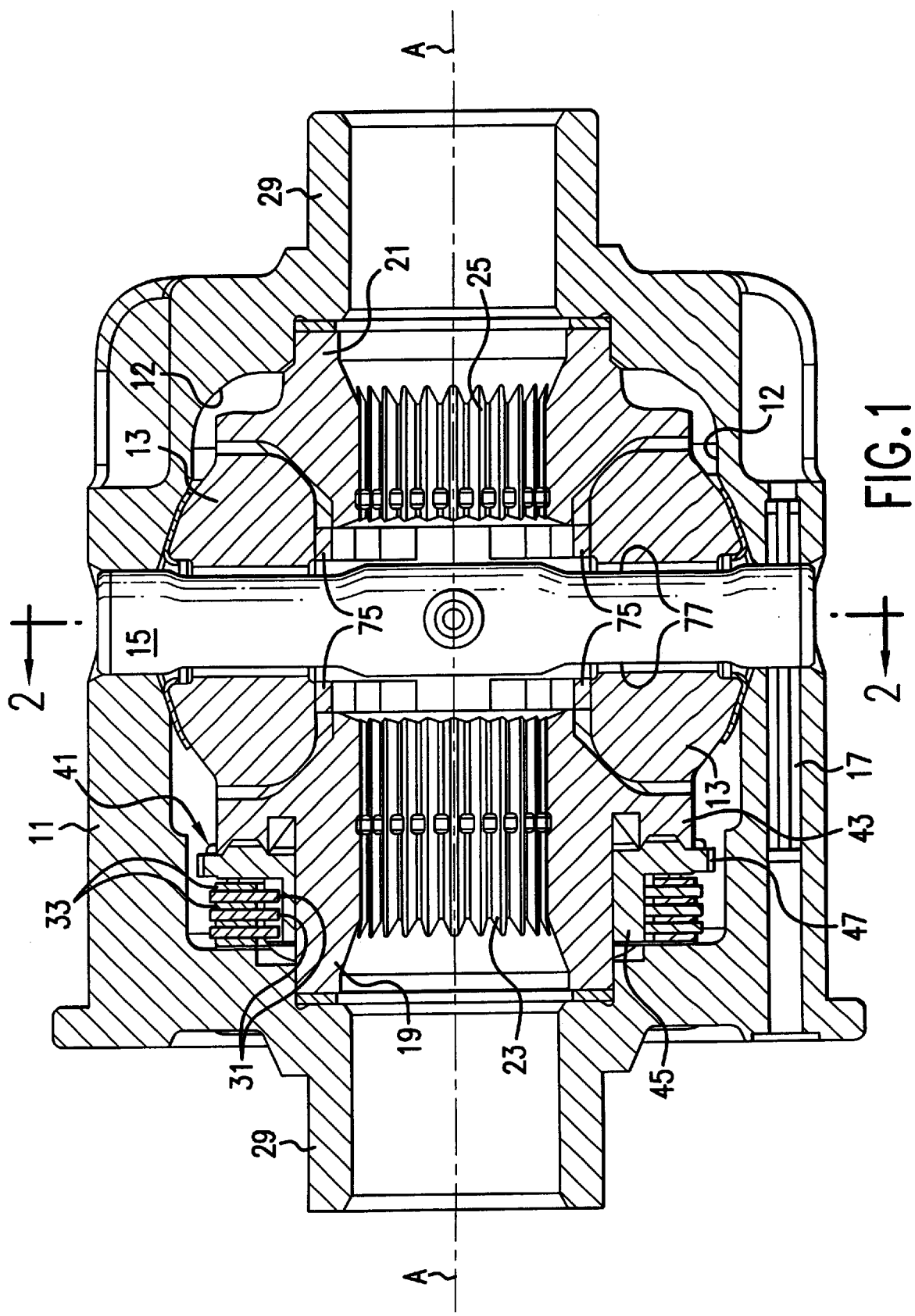
FIG. 1 is an axial cross-section of a locking differential gear mechanism of the type with which the present invention may be utilized.

Referring now to the drawings, which are not intended to limit the invention, FIG. 1 is an axial cross-section of a locking differential of the type with which the present invention may be utilized. The locking differential shown in FIG. 1 includes a gear case 11 defining therein a gear chamber 12. Torque input to the gear mechanism is typically by means of an input gear, such as a ring gear (not shown) which may be bolted, or attached by any other suitable means, such as an adhesive or an interference fit, to the gear case 11, in a manner well known to those skilled in the art.

Disposed within the gear chamber 12 is a differential gear set including a pair of planet pinion gears 13 rotatably mounted on a pinion shaft 15 which, in turn, is pinned to the gear case 11 by means of a lock pin 17. The planet pinion gears 13 comprise the input gears to the differential gear set and are in meshing engagement with a pair of side gears 19 and 21, which comprise the output gears of the differential gear set. The side gears 19 and 21 cooperate to define an axis of rotation A, and define sets of internal splines 23 and 25, respectively, for engagement with mating external splines of a pair of axle shafts (not shown herein). The gear case 11 includes a pair of annular hub portions 27 and 29 on which are mounted pairs of bearing sets (not shown) used to provide rotational support for the gear case 11, relative to the main, outer rear axle housing (also not shown).

During normal, straight-ahead operation of the vehicle, no differentiating action occurs between the left and right side gears 23 and 25, and the pinion gears 13 do not rotate relative to the pinion shaft 15. Therefore, the gear case 11, the pinion gears 13 and the side gears 19 and 21 all rotate about the axis of rotation A as a solid unit.

Under certain operation conditions, such as when the vehicle is turning, or a slight loss of traction occurs, it is permissible for a certain amount of differentiating action to occur between the side gears 19 and 21, up to a predetermined level of differentiating action. Above the predetermined level of differentiating action (for example, a difference of about 100 rpm between the side gears), it is desirable to retard the relative rotation between the gear case 11 and the side gears 19 and 21, to prevent excessive differentiating action between the side gears 19 and 21. As is well known to those skilled in the art, such excessive differentiating action typically occurs when one wheel has good traction (e.g., is on dry pavement), and the other wheel has poor traction (e.g., is on slippery pavement).

In order to retard differentiating action, the conventional locking differential is provided with a lockup means for locking up the differential gear set, and an actuating means for actuating the lockup means. In the subject embodiment, the lockup means comprises a clutch mechanism including a plurality of clutch disks 31 and a plurality of clutch disks 33. The gear case 11 defines a plurality of semi-cylindrical openings 35, and disposed within each opening is a semi-cylindrical guide member 37 (see FIG. 2) which helps to guide the clutch disks 33. Typically, although not shown herein, there is a plurality of compression or wave springs which are seated, at their opposite ends, against the clutch disks at the opposite ends of the clutch pack. The biasing force exerted by the springs must be sufficient to maintain the clutch disks 31 and 33 in their disengaged condition, in the absence of other forces biasing the clutch disks together.

The lockup means further includes a cam mechanism, generally designated 41. As is well know to those skilled in the locking differential art, one function of the cam mechanism 41 is to effect movement of the clutch pack from the disengaged condition shown in FIG. 1 to an engaged condition. By way of example only, the cam mechanism 41 may be made in accordance with the teachings of U.S. Pat. No. 4,389,909, assigned to the assignee of the present invention and incorporated herein by reference. It will become apparent from the subsequent description of the invention that, within the scope of the invention, many different configurations and types of cam mechanism may be utilized.

The cam mechanism 41 includes a main cam member 43, which, in the subject embodiment, and by way of example only is formed integrally with the side gear 19, and a cam member 45 which defines a set of external teeth 47. During normal, straight-ahead operation of the vehicle, with little or no differentiating action occurring, the cam members 43 and 45 remain in the neutral position shown in FIG. 1, with the cam member 45 rotating with the cam member 43 and side gear 19, at the same rotational speed. Movement of the clutch disks 31 and 33 to an engaged condition is initiated by retarding rotation of the cam member 45, relative to the side gear 19 and cam member 43, which causes "ramping" of the cam surfaces in a manner well know to those skilled in the art. This ramping results in axial movement of the cam member 45 to the left in FIG. 1, thus beginning the engagement of the clutch disks 31 and 33. The frictional engagement of the disks 31 and 33 further retards rotation of the cam member 45, thus causing further ramping and increasing the axial loading on the clutch disks 31 and 33.

Figure 2:
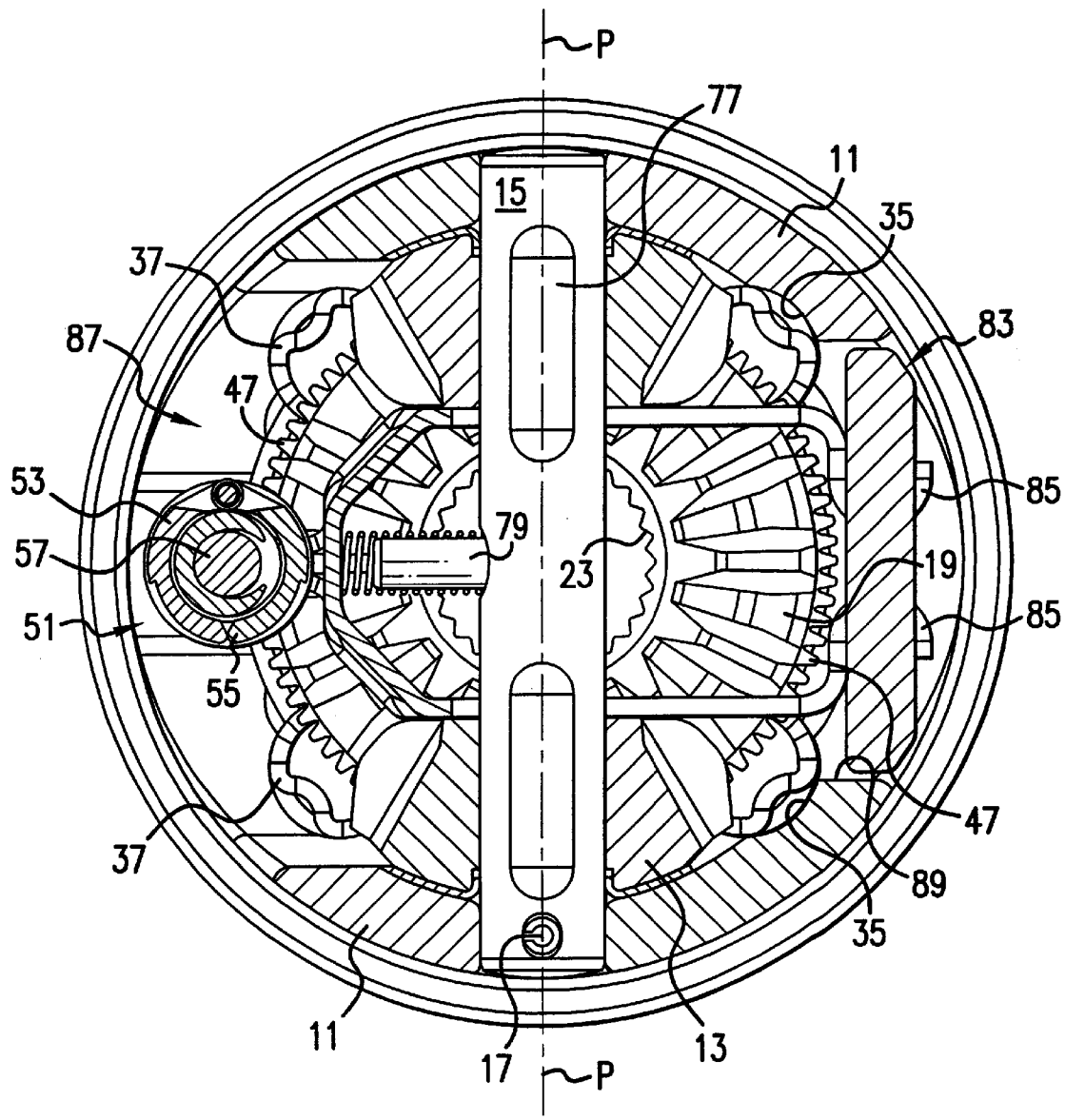
FIG. 2 is a transverse cross-section, taken on line 2—2 of FIG. 1, and on substantially the same scale.
Figure 3:
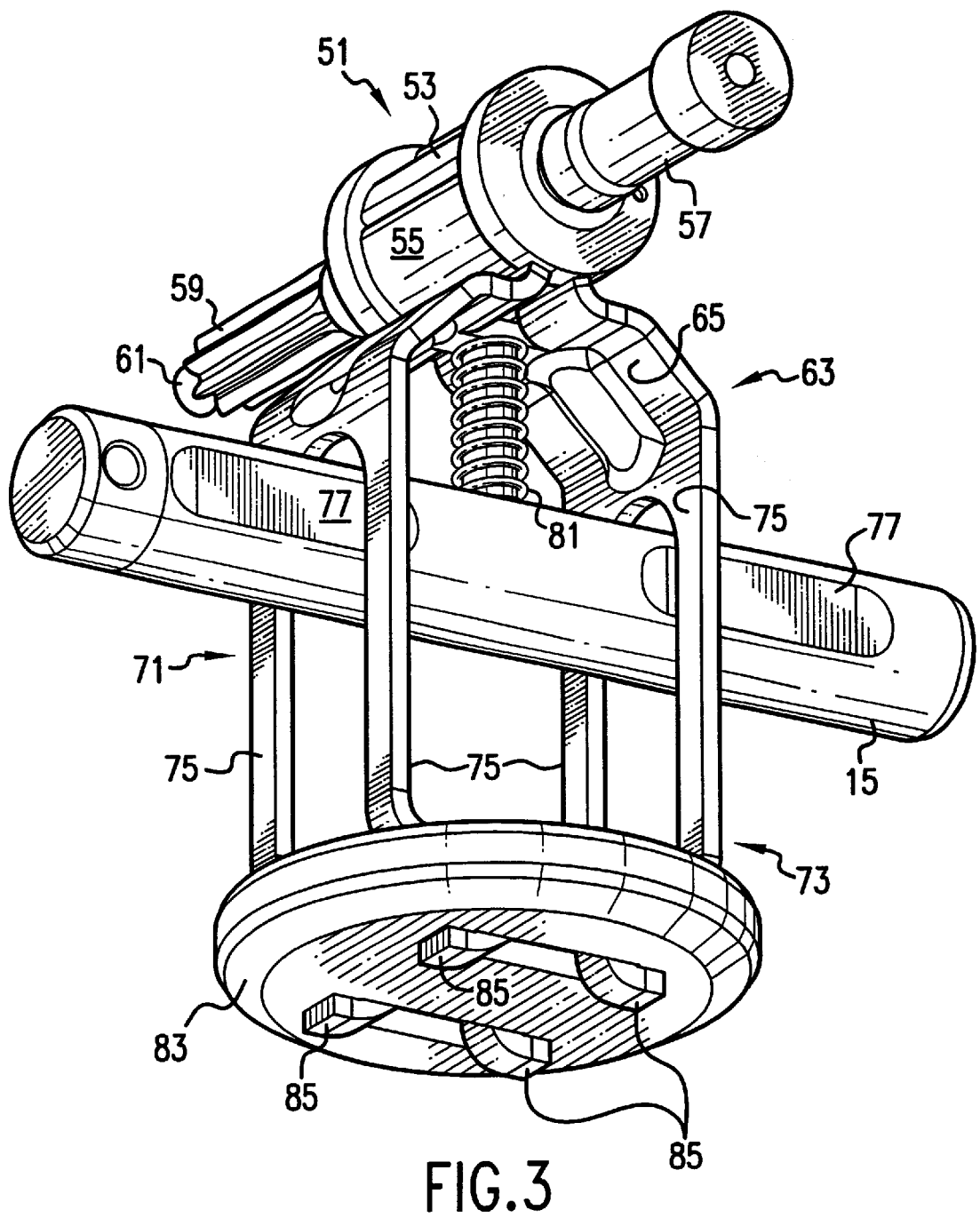
FIG. 3 is a perspective view of the flyweight mechanism and latch mechanism of the present invention, disposed about the pinion shaft, the view of FIG. 3 being similar to that of FIG. 2, but rotated ninety degrees.

Reference will now be made to FIGS. 2 and 3. As was mentioned previously, locking up the differential is initiated by retarding rotation of the cam member 45. In order to retard the rotation of the cam member 45, the conventional locking differential includes a retarding mechanism, which typically comprises a flyweight mechanism, generally designated 51. Within the scope of the present invention, the flyweight mechanism 51 could have a number of different configurations, but in the subject embodiment, it is made in accordance with U.S. Pat. Nos. RE 28,004 and 3,985,045, both of which are assigned to the assignee of the present invention and incorporated herein by reference.

Figure 4:
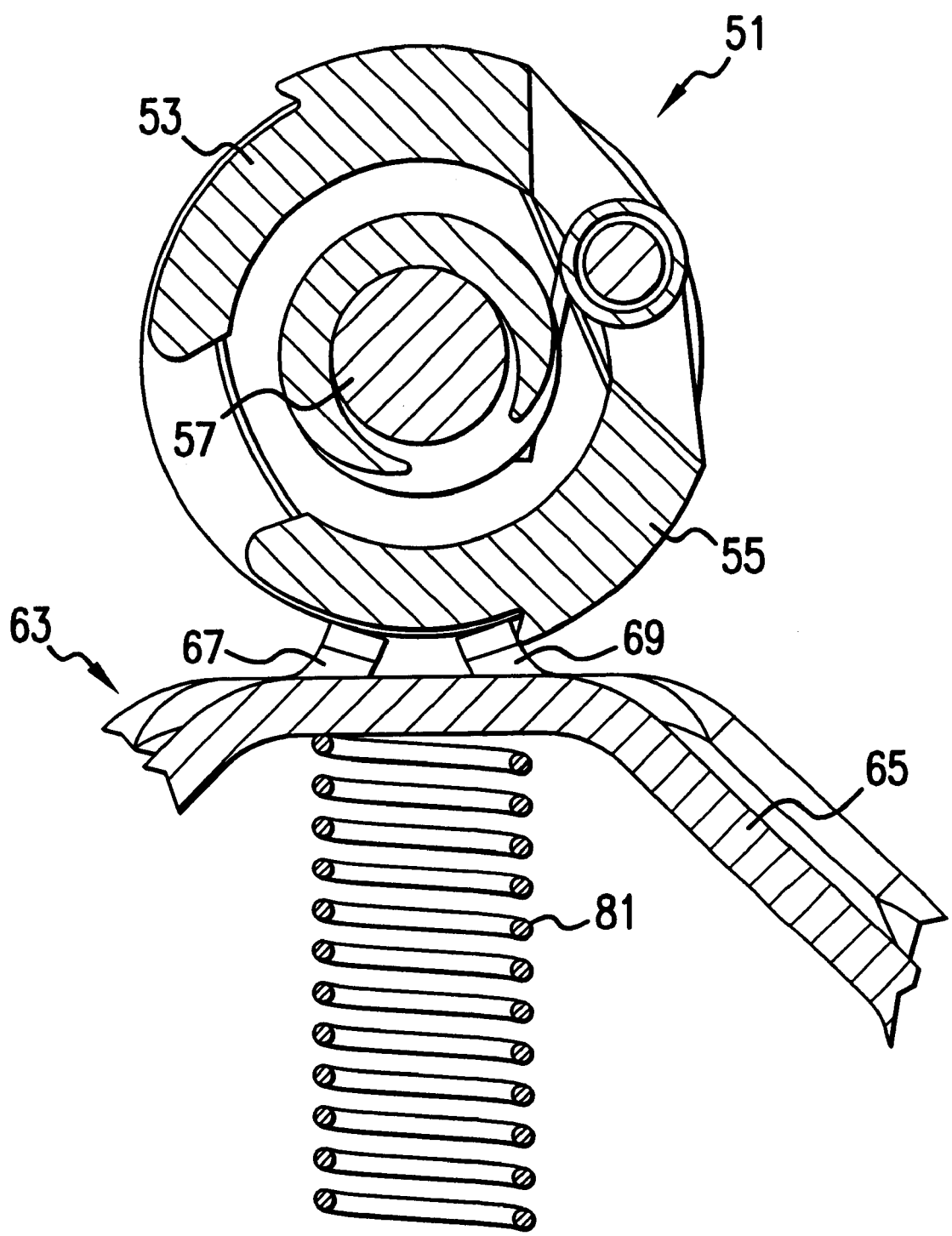
FIG. 4 is an enlarged, fragmentary, transverse cross-section through the flyweight mechanism and latch mechanism, in its operative position, and with sufficient differentiating action occurring to cause latching.

The construction details of the flyweight mechanism 51 are not essential aspects of the invention, and therefore, the flyweight mechanism 51 will be described only briefly herein. As may best be seen in FIGS. 3 and 4, the central portion, axially, of the flyweight mechanism 51 comprises a pair of flyweights 53 and 55, each of which is pivotally mounted about a main support shaft 57. The portion of the shaft 57 which extends to the right in FIG. 3 out from between the flyweights 53 and 55 is received within a bore in the gear case 11. The opposite end of the shaft 57 includes a set of external teeth 59 (see FIG. 3) which are in engagement with the external teeth 47 (see FIGS. 1 and 2) formed about the outer periphery of the cam member 45. Adjacent the teeth 59, the shaft 57 terminates in a shaft support portion 61, which is also rotatably received within the gear case 11, such that both ends of the shaft 57 are rotatably supported. Those skilled in the art will understand that, when no differentiating action is occurring, i.e., when the cam member 45 is not rotating relative to the gear case 11, the flyweight mechanism 51 does not rotate about its axis, but instead, only rotates with the gear case 11 about the axis of rotation A. When the flyweight mechanism is in the nondifferentiating condition just described, the flyweights 53 and 55 remain spring biased to their retracted position shown in FIGS. 2 and 3.

However, if differentiating action begins to occur between the side gears 19 and 21 and the gear case 11, there will be relative rotation between the cam member 45 and the gear case 11, such that the engagement of the teeth 47 and 59 will cause the flyweight mechanism 51 to begin to rotate about its axis. When the differentiating action reaches a predetermined level, the centrifugal force acting on the flyweight 53 and 55 is sufficient to bias them outwardly (see FIG. 4) and into engagement with a latch mechanism, generally designated 63.

As is well know to those skilled in the art, once engagement of either flyweight (53 or 55) with the latch mechanism occurs, the flyweight mechanism 51 is no longer able to rotate as it was previously, and the result is that the rotation of the cam member 45, with the side gear 19 is retarded, resulting in rotation of the cam member 45 relative to the cam member 43, thus initiating ramping and loading of the clutch pack in the manner described previously.

Referring now primarily to FIG. 3, the latch mechanism 63, which comprises an important aspect of the present invention, will be described in some detail. Preferably, the latch mechanism 63 comprises an integral, generally U-shaped member which would typically be formed by stamping from a flat steel sheet, of relatively heave gauge. In viewing FIG. 3, and referring to the latch mechanism 63 as being "U-shaped", it will be understood that the mechanism 63 is an upside down U. Thus, the latch mechanism 63 includes a "bottom" portion 65 which defines a pair of latch members 67 and 69, the latch member 67 being disposed to engage the flyweight 53, while the latch member 69 is disposed to engage the flyweight 55, as may be seen in FIG. 4. Preferably, the latch members 67 and 69 can be formed integrally with the bottom portion 65, simply by deforming the members 67 and 69 out of the bottom portion 65 during the stamping process, in a manner well known to those skilled in the art.

In accordance with an important aspect of the invention, the U-shaped latch mechanism 63 includes a pair of upright leg portions 71 and 73, and preferably, each of the leg portions 71 and 73 is, itself, generally U-shaped, comprising a pair of individual leg portions 75. In other words, the latch member 63 comprises the bottom portion 65 and four individual leg portions 75 (see also FIG. 1). Preferably, each pair of individual leg portions 75 are disposed on opposite sides of the pinion shaft 15, and closely spaced apart from a respective one of the flat surfaces 77 formed in two pairs on the pinion shaft 15. These flats 77 are primarily for the purpose of allowing lubricant to flow between the pinion shaft 15 and the pinion gears 13. It will be understood by those skilled in the art that an important aspect of the invention is proper "location" of the latch mechanism 63 within the differential. One method for locating the mechanism, as best shown in FIG. 1, is by letting the pinion gears 13 and side gears 19 and 21 locate the mechanism by controlling the position of the four individual leg portions 75.

As may best be seen in FIG. 2, a support pin 79 (omitted from FIG. 4) is received within a shallow bore in the pinion shaft 15, and extends toward the bottom portion 65 of the latch mechanism 63. Disposed about the pin 79 is a coil compression spring 81, having its lower end in FIG. 3 seated against the outer surface of the pinion shaft 15, and its upper end seated against the underside of the bottom portion 65. Thus, the function of the spring 81 is to bias the latch mechanism 63 upward in FIGS. 3 and 4 toward an operative position in which the latch members 67 and 69 are in position to engage one of the flyweights 53 and 55, depending upon the direction of rotation of the flyweight mechanism 51. It should be apparent to those skilled in the art that various other means can be utilized for retaining the ends of the compression spring 81, including having a retainer portion formed integrally with the bottom portion 65 of the latch mechanism 63.

As may best be seen in FIGS. 2 and 3 the lower end of each of the individual leg portions 75 extends through a weight, generally designated 83. Preferably, each of the individual leg portions 75 includes a lower, terminal portion 85 which is bent somewhat inwardly (toward an opposite leg) then extends through an axial opening in the weight 83, and then is bent outwardly to retain the weight 83 in a fixed position relative to the leg portions 75, as shown in FIGS. 2 and 3. Whereas the flyweight mechanism 51 is preferably disposed within one window 87 formed in the gear case 11, the weight 83 is preferably disposed in an opposite window 89. Thus, another means for locating the latch mechanism 63 is to have the individual leg portions 75 closely spaced apart relative to the flat surfaces 77, while having the weight 83 closely spaced apart within the window 89, those two relationships being sufficient to locate the entire mechanism 63.

As is well know to those skilled in the art, it is not desirable for a locking differential to be able to lock up above a predetermined vehicle speed, such as twenty or twenty-five miles per hour, because of the effect such a locked up condition would have on the handling of the vehicle. Therefore, the weight 83 is provided such that, above the predetermined rotational speed of the differential device, the resulting centrifugal force will overcome the biasing force of the spring 81 and move the latch mechanism 63 from its operative position shown in FIGS. 2 and 3 along a straight, generally diametrally-oriented path, to an inoperative position. In accordance with one aspect of the invention, the support pin 79 provides a very simple, inexpensive arrangement for defining the inoperative position of the latch mechanism 63. When the bottom portion 65 engages the upper end of the pin 79, the latch mechanism 63 has reached its inoperative position. Alternatively, and as best shown in FIG. 3, when the U-shaped surface between each pair of individual leg portions 75 has engaged the outer surface of the pinion shaft 15, the latch mechanism is in its inoperative position. In the inoperative position, the latch members 67, 69 are moved far enough away from the flyweight mechanism 51 that, even with the flyweights 53 and 55 fully extended (as in FIG. 4), there can be no latching engagement between a flyweight and a latch member, thus making the entire actuating means inoperative.

In accordance with one important aspect of the invention, and as may best be seen in FIGS. 2 and 3, the flyweight mechanism 51 and the latch mechanism 63 which comprise the actuating means for actuating the lockup means are both symmetrical about a plane passing through the pin 79 and through the axis of the shaft 57, perpendicular to the axis of the pinion shaft 15. As a result of the above-described symmetry, it has been observed that the differentiating action at which engagement occurs is substantially the same for either direction of rotation of the flyweight mechanism 51, thus resulting in lower hysteresis than in the prior art, commercial locking differentials.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential gear mechanism comprising a gear case defining a gear chamber, a differential gear set disposed in said gear chamber, and including at least one input gear and a pair of output gears defining an axis of rotation; lockup means for locking up said differential gear set to retard differentiating action, and actuating means for actuating said lockup means; said lockup means including a clutch pack operable between an engaged condition, effective to retard relative rotation between said gear case and said output gears, and a disengaged condition; said lockup means further including cam means operable to effect said engaged condition of said clutch pack, said actuating means including retarding means operable to engage said cam means and retard a portion of said cam means, said retarding means comprising a flyweight mechanism rotatable about its axis at a speed generally proportional to the level of differentiating action, and defining a stop surface moveable from a retracted position to an extended position in response to a predetermined level of differentiating action; said actuating means further including a latch mechanism including a latch member and means biasing said latch member toward an operative position in which said latch member is disposed to engage said stop surface when said stop surface is in said extended position, said latch mechanism further including a weight disposed oppositely from said latch member, about said axis of rotation, said weight being operable to move said latch mechanism, in opposition to said biasing means, along a straight, generally diametrally-oriented path in response to a predetermined rotational speed of said differential gear mechanism, to move said latch member from said operative position to an inoperative position, above said predetermined rotational speed, characterized by:

(a) said latch mechanism comprising an integral, generally U-shaped member, including a bottom portion and a pair of upright leg portions;

(b) said bottom portion of said U-shaped member defining said latch member formed integrally therewith; and (c) said pair of upright leg portions of said U-shaped member extending past said axis of rotation, said weight being fixed to said leg portions.

2. A differential gear mechanism as claimed in claim 1, characterized by said differential gear set comprising a pair of input gears mounted for rotation about a pinion shaft fixed relative to said gear case, said pinion shaft defining an axis disposed perpendicular to said axis of rotation of said output gears.

3. A differential gear mechanism as claimed in claim 2, characterized by said means biasing said latch member toward said operative position comprises a coil compression spring having one end seated relative to said pinion shaft and another end seated relative to said bottom portion of said U-shaped member.

4. A differential gear mechanism as claimed in claim 1, characterized by said latch member comprises a portion of said bottom portion of said U-shaped member being displaced away from said axis of rotation and toward said flyweight mechanism.

5. A differential gear mechanism as claimed in claim 2, characterized by each of said upright leg portions of said U-shaped member being generally U-shaped and comprising a pair of oppositely disposed individual leg portions, said individual leg portions being disposed on opposite sides of said pinion shaft.

6. A differential gear mechanism as claimed in claim 5, characterized by said pinion shaft defining a pair of opposite flat surfaces disposed adjacent each of said input gears, each pair of said individual leg portions being generally parallel, and closely spaced apart relative to said opposite flat surfaces, thereby restraining movement of said U-shaped member along said diametrally-oriented path.

\* \* \* \* \*